July 13, 1954

A. C. PETERSON 2,683,574

VARIABLE SPEED AIRCRAFT HAVING
ADJUSTABLE SWEPT-BACK WINGS

Filed March 31, 1950

INVENTOR

Adolphe Peterson.

July 13, 1954

A. C. PETERSON 2,683,574

VARIABLE SPEED AIRCRAFT HAVING
ADJUSTABLE SWEPT-BACK WINGS

Filed March 31, 1950

INVENTOR
Adolph C. Peterson.

Patented July 13, 1954

2,683,574

UNITED STATES PATENT OFFICE 2,683,574

VARIABLE SPEED AIRCRAFT HAVING ADJUSTABLE SWEPT-BACK WINGS

Adolphe C. Peterson, Minneapolis, Minn.

Application March 31, 1950, Serial No. 153,237

13 Claims. (Cl. 244—46)

1

My invention relates to air-craft and particularly to an air-craft having especially the characteristic of large variability in speed of flight, so that it is therefore called variable speed air-craft.

The principal objects of my invention are to provide an air-craft which may have high travel or cruising speed and which may at the same time by adjustment in flight have such relatively low speed when desired, that it may be landed with comparative ease and lack of danger. An especial object is to provide a form of wing sustentation and adjustment of such sustentation means, for use on land or in flight, as will provide for ease in adjustment of the wing or sustentation means, in that type of air-craft, which is especially suited for the higher speeds of travel, especially such speeds as are commonly called near-sonic, or even super-sonic speed. An object is especially to provide a type of aircraft, which will be especially suited for the very high speeds required for the war or fighter-type of air-craft, which are required for the defense of the country in war. And it is the object to provide this type of high-speed aircraft, for such use, especially in some types of commercial travel, as it may have. The object is more particularly, to provide a type of wing sustentation means, which may in some conditions of use or flight, be used or provide the type of sustentation wing means which is adapted to the very high speeds of flight, and which will be adapted also, by its means of adjustment, to provide the different type of wing means which is adapted to slow speed, such as may be used for landing the air-craft on land or air-craft carriers, or otherwise, and the object is to provide such means in a form which is relatively strong and durable, and which is adapted to maintain the balance and trim of the air-craft in such adjustment and different flying conditions. In general the objective is improvement of high-speed war and commercial or civilian types of air-craft.

The principal devices and combinations of devices, comprising my invention, are as hereinafter described and as defined in the claims. In the accompanying drawings which illustrate my invention in several different forms, like characters refers to like parts throughout the several views, in so far as practicable. Referring to the drawings:

Figures 1, 2, 3, 4 illustrate one form of my device, in the detailed features and elements of the wing adjustment means, and of these figures;

2

Figures 5, 6, 7, 8, 9 show the general placing and use of my device in the air-craft structure, the wing adjusting means of Figures 1, 2, 3, 4, being shown only diagrammatically in these figures.

Figures 10, 11, 12, show a modified form of the wing adjusting means, that is a modified form of the structure shown in Figures 1, 2, 3, 4. Of these figures.

Figures 14 and 15 diagrammatically show the circuits of the first and modified forms, respectively.

Referring first to Figures 1 to 4 both inclusive, these figures show principally the wing adjusting means, in largely magnified scale over the Figures 5 to 9, and show only portions of the fuselage frame structure which are adjacent these adjusting means, the longitudinal fuselage frame members being designated 1, and the vertical members 2, and the horizontal frame members 3. The horizontal frame members 3, which are transversely of the fuselage, are members which may be low in the fuselage structure or high in that structure or in median position, such location depending on whether the wing structure is a low or high or median structure.

The horizontal frame members designated 3 have integrally formed strong brackets 4 and 5 extending downwardly and upwardly respectively and these brackets are firmly secured by welding or otherwise to a forward set of four hydraulic cylinders, each designated 6 and all of these extend horizontally in the fuselage structure and are placed so that their axes, horizontally extended, form the four corners of a rectangular shape in a vertical plane, this rectangular shape or form being approximately as wide as the fuselage structure horizontally, and being as high vertically as will in any construction seem appropriate or necessary for strength. The cylinders 6 may be of any necessary length, so as to permit the necessary adjusting movement as hereinafter described, and they may be say five feet or ten feet or more or less in any construction this depending primarily on the relative size of the air-craft and its wing structures.

Rearwardly of the cylinders 6, there are located four other hydraulic cylinders, each designated 7, each being of a length similar to the length of the cylinders 6, and each being placed so that its axis extended is exactly co-incidental with the axis of the similarly placed one of the cylinders 6. The cylinders 7 form a rectangular shape by their axes, similar to that formed by axes of cylinders 6 and they are each firmly secured in the fuselage structure by associated brackets 8 welded or otherwise secured to them and also firmly secured or formed integrally with the set of horizontal fuselage frame members 9, the latter also being firmly secured to the vertical fuselage frame members 2 and longitudinal fuselage frame members 1. The cylinders 7 are of substantially the same internal diameter as cylinders 6 or a suitable internal diameter. They are located a distance rearwardly of cylinders 6 which is equal to the length of the cylinders 6 or 7, and plus a distance sufficient to accommodate the longitudinal length (of the fuselage) of the wing supporting means hereafter described, in the latter's forward or rear movement in the fuselage structure.

Four piston or plunger members, each designated 10, are mounted in the cylinders 6 and 7, each piston member 10 being mounted in one pair of cylinders a front cylinder 6 and a rear cylinder 7 whose axes lie co-incidently as extended, so that each piston member 10 will thus be mounted to slide forwardly or rearwardly in the pair of cylinders 6—7, which are at one corner of the rectangle formed by the axes of all the cylinders extended. Each piston member 10 is of a length, longitudinally of the fuselage, such that it will always be supported firmly by its associated pair of cylinders in which it slides, and to accomplish this support the cylinders 6 and 7 must all be of a length in its internal bore, somewhat greater than the maximum forward or rearward movement of the pistons as hereafter described in connection with the wing supporting frame or member. The piston members 10 must be of a strength sufficient for the support function hereafter described.

The four piston members 10 have formed integrally with them or firmly secured to them the upper and lower members 11 and 12, respectively, of the wing supporting unit or frame, generally designated 13, and which has the strong vertical members 14 and 15 which at opposite ends of the unit firmly secure the members 11 and 12 together as one unit. The members 11 and 12 each extend at their ends, somewhat beyond the members 14, 15, so that the pair of bearing brackets 16 at one end of the unit form a bearing for the upper and lower ends of a wing pivot 17, and so that the pair of bearing brackets 18 at the other end of the unit form a bearing for the upper and lower ends of a wing pivot 19. The bearing brackets 16 and 18 are integrally formed with members 11 and 12 at ends of these members, and the pivots 17 and 19 are placed to turn easily in them as bearings. Caps 20 formed at ends of the pivots 17 and 19 are formed with the pivots and serve to strongly support the pivots in their places in the brackets.

Each pivot 17 and 19 has integrally formed with it at a position mid-way of its length vertically, a comparatively large worm-wheel 21 or 22. Each pivot 17 and 19, respectively, supports one wing spar 23 and 23a, respectively, by its pair of members 24 and 25, respectively, one pair being placed with one member above and one member below its associated worm wheel 21 or 22, and supported on the pivot. Each of the pairs of members 24 and 25 has a split half bearing or cap 24a and 25a, respectively and these split halves are united with the members 24 or 25 by bolts 26, 27. Each pivot 17 and 19 has spur gear teeth or keys 28, 29, respectively, which fit in corresponding grooves in the members 24 and 25, so that the wing spars 23 and 23a are thus firmly secured to their respective pivots 17, and 19, so that whenever the pivots 17 and 19 turn the wing spars 23 and 23a will turn simultaneously with them and in exactly equal degree. The wing spars 23 and 23a are thus pivotally mounted on the wing supporting unit 13, to be swung in the horizontal plane or relatively horizontal plane, by means of the associated worm wheels 21 and 22. It should be noted here that the pivots 17 and 19 may be placed so that their axes are somewhat inclined rearwardly at their tops, so that the wing spars may have a comparatively slight downward movement as a component of its rearward movement. This is not however a necessary or indispensable factor, as it depends somewhat on the particular form of the wing surfaces both of the wings mounted on spars 23, 23a but also of the form of the supplementary wing structures, hereafter described.

The worm wheels 21 and 22, respectively are in permanent engagement with small worm pinions 30, 31, respectively, and the latter are disposed so their axes are transversely of the fuselage structure, and they are fixed securely on opposite ends of a rotatable drive shaft 32, the latter being common to the worm pinions, and mounted in bearing brackets 33 formed integrally with or secured to the wing supporting unit 13. The drive shaft 32 has a pair of small spur wheels 34 fixed securely on it so that through them the drive shaft may be rotated in either direction, as it moves forwardly or rearwardly, by rolling of the spur wheels 34 on the pair of spur rails or toothed rails 35, the latter being firmly secured to the horizontal frame members 3 and 9, at forward and rear ends, respectively. The toothed rails 35 are thus firmly secured against movement in the fuselage structure, whereas the spur wheels 34 may roll over them and thereby turn drive shaft 32 and with it worm pinions 30, 31, and with the latter worm wheels 21, 22, and with the latter wing spars 23 and 23a. It will be noted that the worm pinions and worm wheels have a form such that the worm wheels 21, 22 and wing spars 23, 23a, when turned will turn in opposite directions, so that the wing spars are thus moved simultaneously into their forward or laterally extended positions, relative to unit 13, or simultaneously into their rearward retracted positions, relative to unit 13. It will also be noted that the spur wheels are so placed above the toothed rails or tracks and the worm wheels are so formed, that as the wing supporting unit 13 moves forwardly and spur gears or wheels 34 are moved forwardly, the drive shaft 32 and worm pinions are so turned that the wing spars are swung rearwardly relative to their pivots, that is into their retracted positions, whereas, when the unit 13 moves rearwardly, the drive shaft 32 and worm pinions are so turned that the wing spars are swung forwardly on their pivots, that is into their laterally extended or slow speed positions.

Figures 1, 1A:
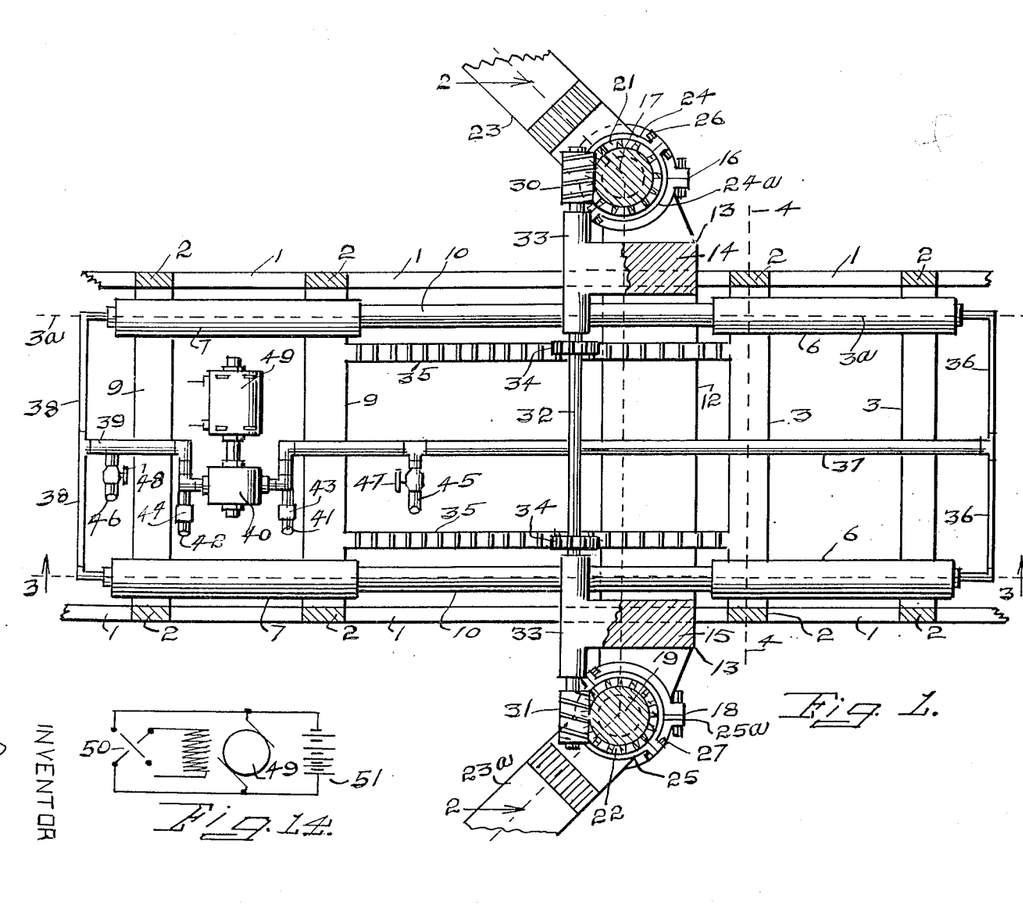
Figure 1 is a view in horizontal section on the lines 1—1 of Figures 2, 3, 4, this view showing generally only the operating features of the wing adjustment means, with broken away portions of the main pair of wings, and adjacent sections of the fuselage frame, some parts being shown in full plan view.
Figure 2:
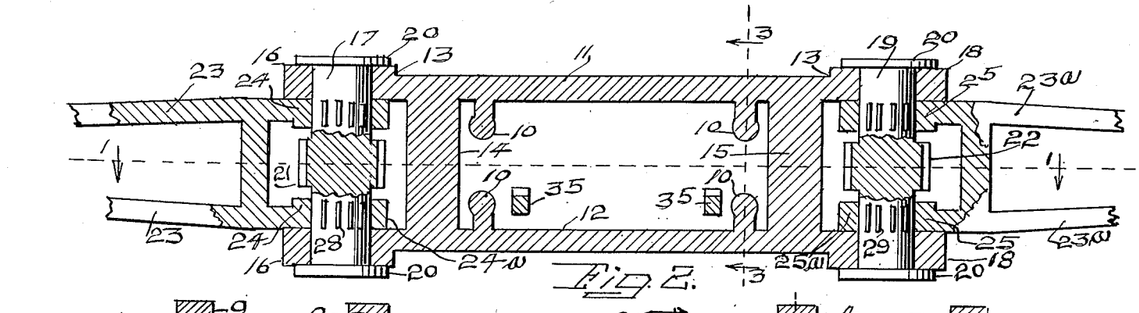
Figure 2 is a view in vertical section along the angled line 2—2 of Figure 1, adjacent ends of the main wing spars being shown, no part of the fuselage structure itself, being shown.
Figure 3:
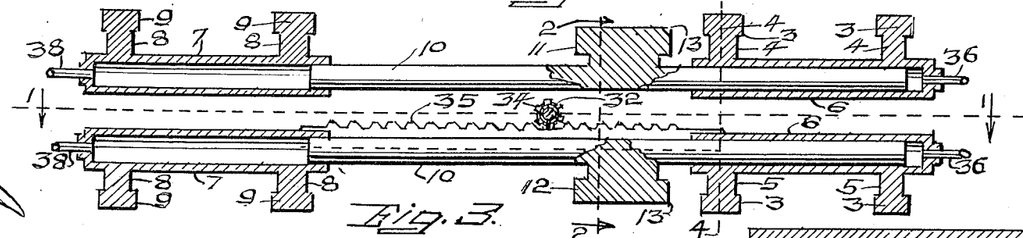
Figure 3 is a view in vertical section on the line 3—3 of Figures 1 and 2, some sections of fuselage frame structure being shown, namely the portions of frame structure which secure the means in the fuselage structure.
Figure 4:
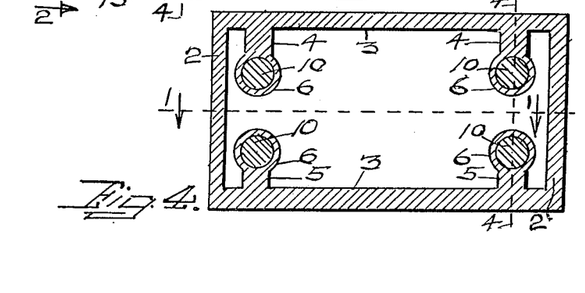
Figure 4 is a vertical section on the line 4—4 of Figures 1, 3 this being a section of the frame which secures the front or forward set of supporting cylinders in place, and through these cylinders and their pistons at this section. A section through the rear set of cylinders and their immediate supporting frame, would be similar and is therefore not shown.

The cylinders 6 at their forward or closed ends have conduits (four) 36 connected into them and these conduits are unobstructed and connect into a common conduit 37. Likewise the rear cylinders have conduits (four) each denoted 38, which connect into a common conduit 39, and that thus all four cylinders 6 are served by one common conduit 37 and likewise all cylinders 7 are served by one common conduit 39. The common conduit 37 connects with one side of a reversible pump 40 and the conduit 39 connects with the other side of the reversible pump 40, so that the reversible pump 40 may discharge liquid under pressure to the four cylinders 6 of the forward set of cylinders as it draws liquid from the other set of four cylinders 7, and vice versa. Either conduit 37 or 39 may draw liquid from supply pipes 41 or 42, non-return valves 43, 44 being interposed in these supply pipes. The latter connect with any source of supply, as a tank, on the air-craft. Either conduit 37 or 39 may be relieved of pressure by means of a discharge pipe 45 or 46, manually controlled valves 47, 48, normally preventing discharge thereto. The discharge pipes may discharge to tank stated. The reversible pump 40 may be driven in either direction for pumping in either direction, by means of electric motor 49 which is a reversible motor controlled by reversing switch 50, and supplied by any means as by battery 51, Fig. 14.

Figure 8:
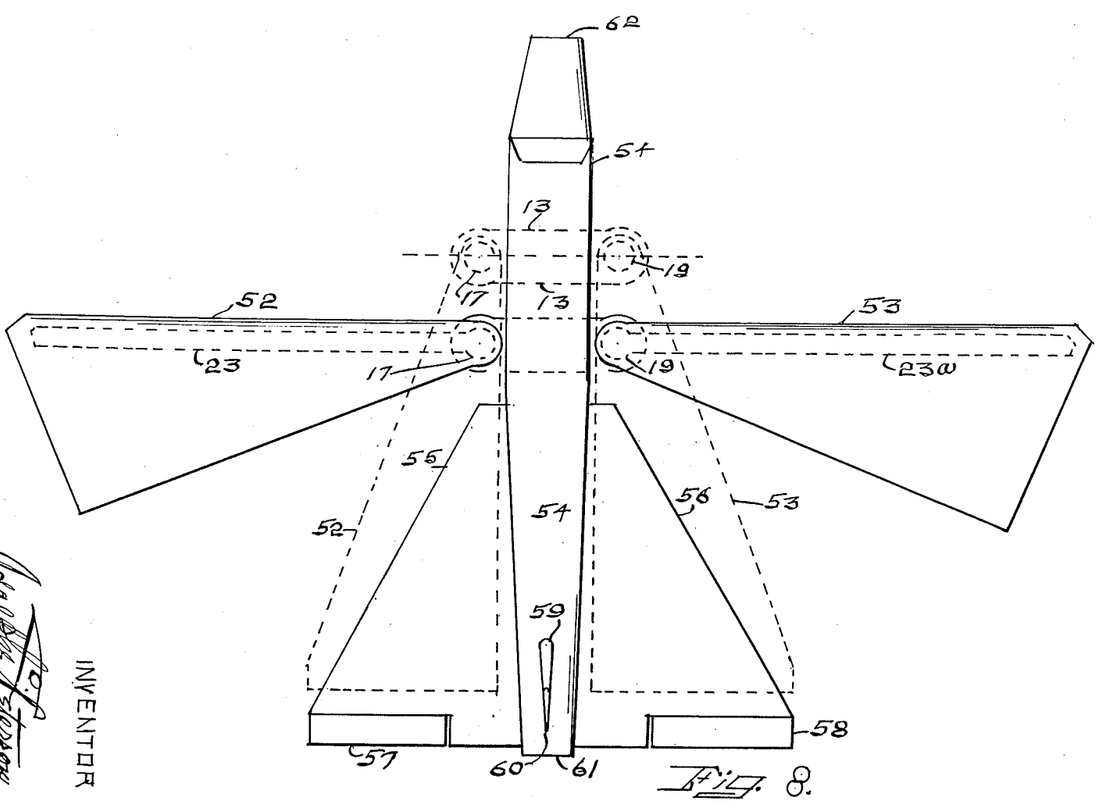
Figure 8 is a plan view of the air-craft structure embodying my device, this view showing it as the structure appears in plan, but in the opposite condition of that shown in Figure 5, that is, in this Figure 8 the device is shown with the main wing structure in the laterally extended positions so that the structure is thus in condition for low speed flight, as for landing. It should be noted here that either set of wing structures may be called the main wing structure and the other the supplementary in so far as sustentation is concerned, that is either may contribute the main support and the other the supplementary. But for the purpose of description the adjustable structure is called the main wing structure.

The wing spars 23, 23a have wing plane surfaces mounted on them in the usual way or any way forming the most efficient shape for the dual method of flight as hereafter described, and they form sustentation or lift wings in either condition as hereafter described. These wings, designated generally as 52 and 53 have the general shape, horizontally, as shown in Figure 8, but it should be understood that these wings may have any shape, in horizontal plan, which will most efficiently suit any particular construction, and especially, any particular construction of the rear or supplemental wings, as hereafter described. The horizontal plan or contour of the wings 52, 53 will depend also to some extent on how they are associated with the fuselage and how they are made to fit into any particular construction of fuselage, that is their shape may be varied generally without departing from the contemplation and purpose of my construction. The contour of the wings 52, 53 should be such that they not only provide efficient lifting wings in either condition of flight, but also such that when retracted into their retracted or high speed condition, they will adequately and snugly fit against the plane surface of the supplementary wings hereafter described.

Figures 5, 6, 9:
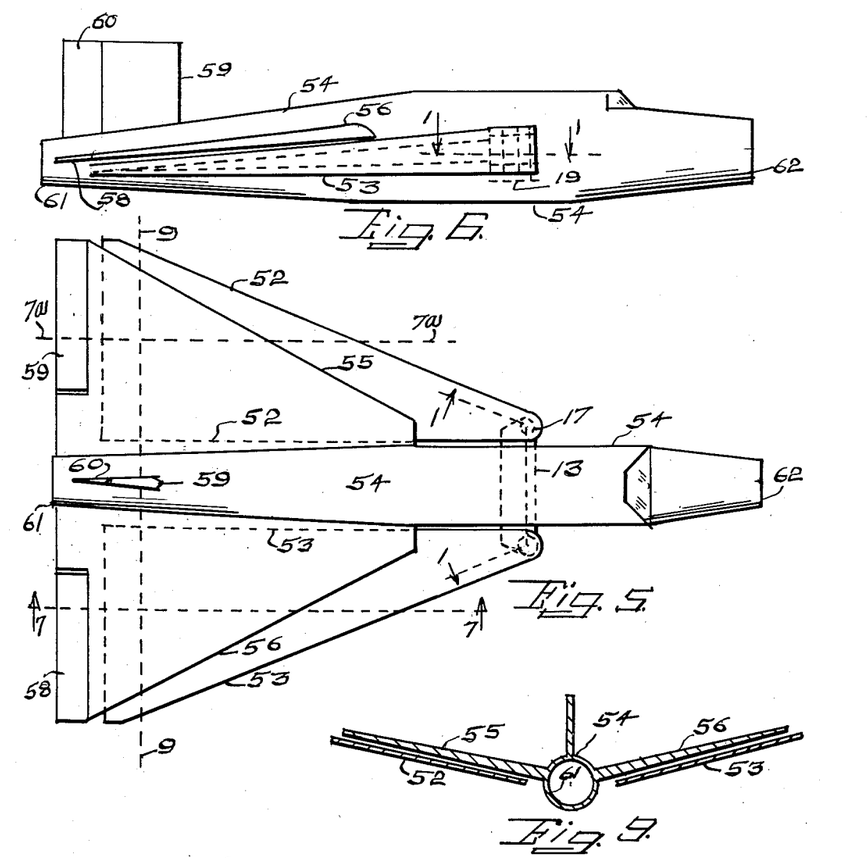
Figure 5 is a plan view of the air-craft structure embodying my device, this view showing it as the structure appears in plan, when in high speed flight or condition therefore.
Figure 6 is a side view of this air-craft structure.
Figure 9 is a vertical section transversely of the wing structures, as shown in Figure 5, and on the line 9—9 of Figure 5.

Referring now to Figures 5 to 9, both inclusive, the fuselage structure is there generally designated 54, and this fuselage structure has incorporated as a part of its frame, which supports it, the longitudinal frame members 1, the vertical members 2, the horizontal members 3, the horizontal frame members 9 and such other members as are usually a part of a fuselage construction, and as are necessary for its strength and support, the designated members being as in Figs. 1, 2, 3, 4. The members 1 are longitudinally of the fuselage 54 as in figures, and the members 3 and 9 are transversely of the fuselage and support the unit 13, the wing supporting frame with its supported wing spars 23, 23a, in the position such that the unit 13 is transversely of the fuselage as shown in Figures 5 and 8. In Figure 5 the unit 13 and the wing spars 23, 23a with their wings 52, 53, are shown in the retracted or high speed position, that is with the unit 13 moved forwardly of the fuselage, and the wing spars 23, 23a with wings 52, 53 swung toward the rear of the direction of flight, which looking at Figures 5, 6, 8, is rightwardly of the figures.

Figure 7:
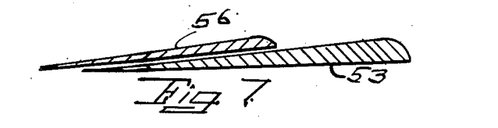
Figure 7 is a vertical section on the line 7—7 of Figure 5 (a section on the line 7a—7a would be similar and is not shown, therefore).
Figure 13:
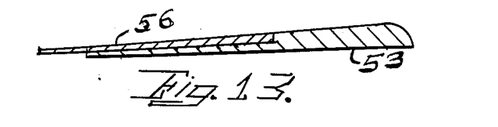
Figure 13 shows recessing of main wing section for close association.

In the Figures 5 to 9, a supplementary wing structure consisting of the two wings 55 and 56, one leftwardly and the other rightwardly of the fuselage at the rear part thereof, is mounted on the fuselage structure or frame thereof, as fixed wings and these supplementary wings are of the swept wing type as shown in Figures 5 and 8. These supplementary wings are formed as wings of the swept wing type usually are, or they may have such form, especially in vertical cross section, as is most sutiable and efficient, so that they will serve in the low speed condition as supplementary support wings, and in the high speed condition, as coupled with the main wings in the position of Figure 5, one supporting wing structure. In Figure 5 it will be seen that the extreme rear tips of the wings 52, 53 are close to the rear sides of the fuselage structure so that the wings 52 and 53 are in major part under the supplementary wings 55, 56 and in close association or contact with the undersurface of the supplementary wings 55, 56, as shown in Figure 7. Each pair of associated wings, the wings 52, 55 on one side, and the wings 53, 56, on the other side are in close association, as shown in the cross section, Figure 7. This association or contact may be as close as the construction and operation will permit, and that should be such that it will be a close association or contact such that air in any volume, which is appreciable, will not be permitted to pass between the wings of each pair 52, 55 or 53, 56. The wing surfaces may be so modified or recessed, as necessary to procure a close fit, and one method of so recessing the wings may be as shown in Figure 13, where the main wing 52 or 53 is recessed on its upper surface so the supplementary wings 55 or 56 may fit into that recess, when in the high speed condition of flight. In the high speed condition, as in Fig. 5, the unit 13 is moved forwardly, as described in connection with Figures 1 to 4.

Referring to Figure 8, the unit 13 and main wings 52, 53 with their wing spars 23, 23a are in the low speed condition, as appears in full lines, and as appears in the dotted lines, the main wings 52, 53, wing spars 23, 23a, and unit 13 are in the high speed or retracted positions. The latter may be called a folded condition. It will be seen in Fig. 8, that unit 13 in the high speed condition, as appears by dotted lines, is moved forwardly by the means described in connection with Figures 1 to 4, and in the low speed condition, as appears by dotted lines, the unit 13 is moved rearwardly so that the main wings 52, 53, as then laterally extended, will occupy a more rearward position, so that by this means of moving the unit 13 and wings 52, 53, the balance may be maintained for flight in either condition. In some constructions, it may be necessary to reverse the relative adjustment action, that is the unit 13 would then move forwardly as the main wings 52, 53 are laterally extended, and the unit 13 would then move rearwardly as the wings 52, 53 are rearwardly retracted or folded. It is contemplated that my device may be used for adjustment in either way, depending on the need in the particular construction, and the weight distribution in the fuselage or wings. In the reverse construction, as immediately above stated, the inclinations of the worm wheels and worm pinions as described in connection with Figures 1 to 4, would be reversed, so that drive of the drive shaft 32 in either direction of rotation would procure this reversal of operation or adjustment. My device is not contemplated to be limited to any particular combination of adjustment, but may be either type as above stated.

It will be seen in Figure 9 that each of the supplementary wings 55, 56 has a slight angle to the horizontal, rising as it extends laterally outwardly from the fuselage anchorage of the wing, so that the pair of wings 55, 56, thus form a dihedral angle of slight degree. This angle to the horizontal on each side, will facilitate the sliding or folding of the main wings 52, 53, into their respective positions, as shown in Figures 5, 7, 9, when they are in the retracted or high speed positions, and will help to stabilize flight. Each supplementary wing 55, 56 has flexibly attached ailerons 57, 58, which are controlled as usual in air-craft, this control not being shown therefore. A vertical stablizing fin 59 is fixed vertically on the rear end of the fuselage, and this bears on its rear end a rudder 60 for directional steering, in flight, this being controlled as is customary in air-craft, and is not shown, otherwise. The air-craft is propelled in the usual manner of very high speed air-craft by impulsion of gases issuing from jet-tube 61, air entering at 62, compression and combustion being effected in the usual manner of jet tube engines by the turbine engine, not shown.

Figure 10:
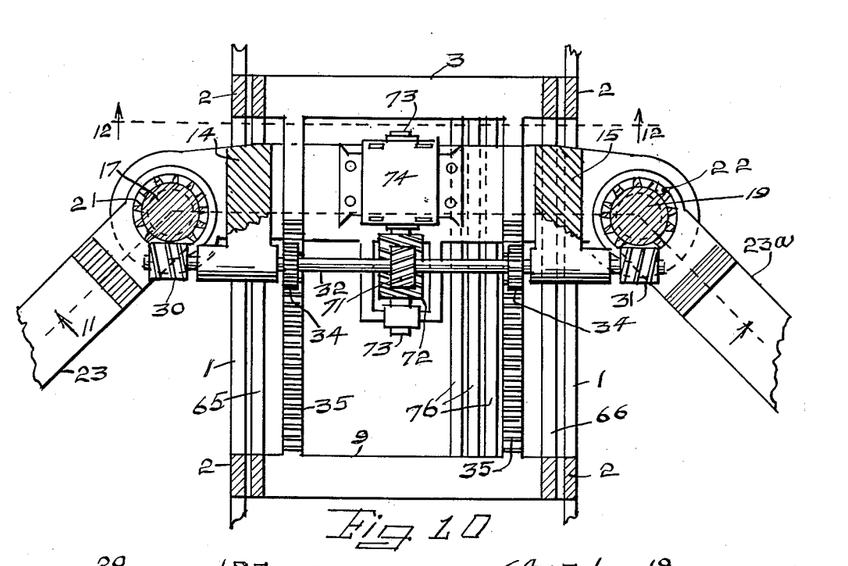
Figure 10 is a view in horizontal section similar to that of Figure 1 and is a section on the line 10—10 of Figures 11, 12.
Figure 11:
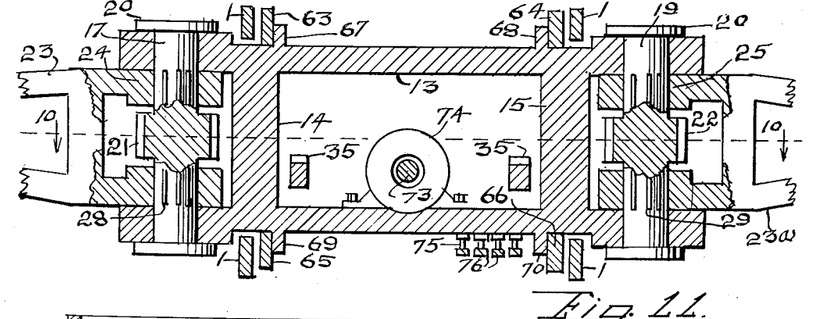
Figure 11 is a vertical section on the angled line 11—11 of Figure 10, some parts being shown in full elevation and others broken away.
Figure 12:
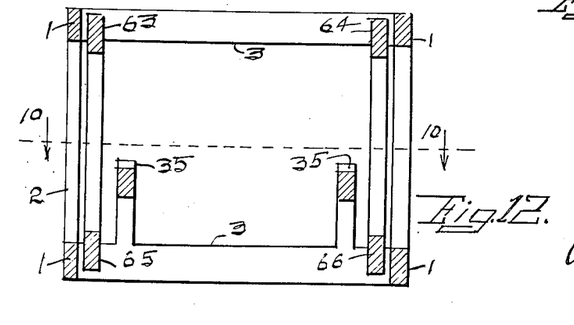
Figure 12 is a vertical section on the line 12—12 of Fig. 10, this view showing some parts of the fuselage structure in side elevation.

Referring now to Figures 10, 11, 12, which show a modified form of the wing adjusting means, the means here shown is in general similar in its effect and construction, to that first shown, and is incorporated in the air-craft structure in the same way, and Figures 5 to 9, both inclusive, which show this incorporation, will equally show the incorporation of this modified form in the air-craft structure. In this form the unit 13, which is the wing supporting frame, supports the wing structure in the same way by the pivots 17 and 19, and the pivots have the worm wheels 21—22 formed on them in the same way, and the pivots are turned in the same manner by the worm pinions 30 and 31.

In this form the unit 13 is not carried on hydraulic pistons or plungers, as supports, but it travels as a slide unit mounted between the fixed slide rails 63, 64, 65, 66, all of the latter being fixed by their ends, by welding or otherwise, to the fuselage frame structure members 3 and 9. These rails are all placed horizontally in the fuselage, that is in the line of flight, and are all parallel to each other, and their surfaces are smoothly polished so that they will permit easy and unobstructed sliding of the unit 13 between them the unit 13 being so formed and of such dimensions, that the unit 13 is firmly held while still being permitted to slide forwardly or rearwardly in the fuselage frame structure. The unit 13 has formed integrally with it or secured thereto a pair of slide-blocks 67, 68 on its upper side, and a pair of slide-blocks 69, 70, on its lower side, these slide blocks being slidable against the sides of the rails 63, 64, 65, 66, as shown in Figure 11, and thereby these slide-blocks serve to guide the unit 13 in its travel forwardly or rearwardly, and to hold the unit 13 and its attached wing spars in their relative position in the fuselage structure.

The toothed tracks or rails 35 and 35, are as in the first form, firmly secured to the fuselage frame structure, and their upper toothed or geared sides, provide geared tracks on which the small spur gears 34 and 34, as in the first form, will roll, the gears turning in opposite directions as they roll forwardly or rearwardly on the tracks. The drive shaft 32 on which they are fixed, in this case is however, turned by different means, the drive shaft 32 having in this form, a worm wheel 71 fixed on it, and this worm wheel 71 being in permanent engagement with a worm pinion 72, whereby the latter turns worm wheel 71 and with it drive shaft 32 and spur gears 34, 34. The drive between worm pinion 72 and worm wheel 71 is at a ratio of many revolutions of worm pinion 72 to worm wheel 71, so that the motor shaft 73 on which worm pinion 72 is fixed may turn at a ratio of many revolutions thereof to that of drive shaft 32. The motor shaft 73 is driven in either direction by reversible motor 74 which is mounted on and fixed on unit 13 to travel therewith in its forward or rearward travel in the fuselage structure.

Figure 15:
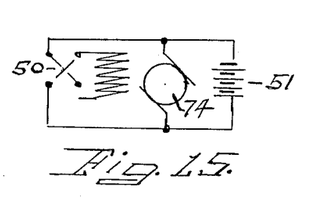

The electric motor 74 is supplied with current and controlled for reversing the direction of rotation of the motor shaft, by conductors which are individually connected with contact brushes or contact wheels 75, such as trolley wheels, and the latter brush or roll along contact or conductor rails or trolley wires, as desired in construction, and denoted each as 76. The latter are fixed by their ends to the fuselage frame structure (not particularly shown) and thus do not travel or move relatively to the fuselage frame structure. In place of this means, the electric motor 74 may be controlled and receive current through any flexible cable which will permit movement of the unit 13, while still permitting of the delivery of current and control from the pilot's cabin by means of switches, in his cabin. The control of the circuit is as shown in Figure 15, which diagrammatically illustrates the reversible control and also a flexible cable may be used instead of the contact rails or conductors 76.

The pilot as he desires, in this form, will control the motor 74 by reversing its direction as he desires, and closing or breaking the circuit through motor 74, and he may thus cause unit 13 and wing spars 23 and 23a, to move in either direction, forwardly or rearwardly, and as the drive shaft 32 revolves, in either direction, to thereby propel the unit 13 by rolling of gears 34, 34, on gear tracks, he causes this travel of unit 13, and simultaneously causes drive shaft 32 to turn worm wheels 21, 22 and pivots 17, 19, in the corresponding movement, as in the first form described, and thus the unit 13 is moved by electric motor 74 and likewise, the pivots 17, 19, are also turned by the power of electric motor 74 operating through drive shaft 32. The wing spars 23, 23a will bear the wing surfaces and will cause the retracted close association with the supplementary wings 55, 56, as in the first form described, and this association is therefore not again shown.

It will be seen in the figures that the worm wheels and pinions which hold the pivots 17 and 19 or move them in the turning action, have such small angles of inclination to their transverse planes, that is the planes of worm wheels or pinions, that they will not turn except when turning impulse is imparted by the motor means described, to the drive shaft 32, so that thus these worm wheels and worm pinions form also holding means which will rigidly hold the pivots 17 and 19 and their attached wings in either of the positions in which they may be placed by the pilot. While providing this holding means, I do not limit my construction to this particular type of holding means, but there may be any type of holding means which may be used in addition, to hold the wings rigidly in either of their positions, that for slow speed or that for high speed flight. Such additional holding means is not shown for simplicity and as the turning means in itself provides one type of holding for the pivots and wings.

It is particularly to be emphasized, that the pivots 17 and 19 may have any slight inclination to the vertical, respecting the fuselage, which will facilitate and contribute to the placing of the wings in either of their positions for best sustentation efficiency in either position, and as will facilitate the consolidation, described. They may be inclined slightly to the longitudinal plane or the transverse plane, and in either direction, according to the particular design and placing of the main wings and supplemental wings.

While I have shown particular devices and combinations of devices in the illustration of my invention, I contemplate that other devices and combinations of devices, may be utilized in the realization of my invention, without departing from the spirit and contemplation thereof.

What I claim is:

1. In an air-craft, a fuselage frame structure, a wing supporting carriage mounted on piston elements reciprocable in cylinder elements mounted and secured longitudinally of the fuselage frame structure, the carriage and associated piston elements movable in the horizontal plane of the fuselage frame structure, a wing pivot at each end of said carriage and a pair of wing sections one mounted by one of said pivots and the other by the other of said pivots at their ends adjacent said fuselage frame structure, means mounted on said carriage and carried therewith and inter-engaged between the fuselage frame structure and the pivoted ends of the wing sections to coincidentally with movement of said carriage in one direction longitudinally of the fuselage frame structure turn said wing sections on their pivots so their free ends move laterally and forwardly or to coincidentally with movement of said carriage in the opposite direction longitudinally of the fuselage frame structure turn said wing sections on their pivots so their free ends move laterally and rearwardly, the one coincidental movement placing said wing sections in horizontally extended positions transversely of the fuselage structure for low speed flight and the other of said coincidental movements placing the said wing sections in rearwardly retracted positions so that the wing sections then form swept wing sections for high speed flight, and means to move a fluid medium into or out of the cylinder elements to procure movement in either direction of the piston elements in the cylinder elements.

2. In an air-craft, a fuselage structure, a main wing structure having a main wing part on one side of the fuselage structure and a main wing part on the other side of the fuselage structure each part being pivoted by a pivot at one end thereof in a mounting at the side of the fuselage structure to be swung forwardly or rearwardly in a plane transversely of the fuselage structure; a supplemental sustentation wing structure fixed at the rear of the fuselage structure in part on one side of the fuselage structure and in part on the other side of the fuselage structure, the said supplemental wing structure having a swept wing form; means for co-incidentally turning the main wing parts on their pivots laterally rearwardly into high speed positions placed so that the main wing parts and the supplemental wing parts are substantially consolidated each main wing part having one exposed face substantially in contact with one exposed face of one part of the supplemental sustentation wing structure in vertically super-imposed relation without intervening air flow space so that the main wing structure and the supplemental wing structure form for high speed flight substantially one wing structure of aggregate exposed surface area substantially less than the aggregate sustentation area of the main wing parts and the supplemental wing parts in the separated positions, the pivots of the main wing parts having their pivoting axes so placed as to secure the consolidation of the wing structures with an angle of incidence for aerodynamic sustentation when the main wing parts are in the laterally rearwardly turned positions; the said means for turning also providing for turning the main wing parts into low speed positions, the main wing parts in the last named positions being positioned laterally extended and forwardly of the supplemental wing structure so that each of the main wing and supplemental wing structures is remote one from the other and each independently of the other provides sustentation support for the air-craft.

3. All of the means as stated and claimed in claim 2, and in combination therewith, the means for turning the main wing parts including, worm wheels, one fixed to each main wing part on the axis of the pivot and worms, one in engagement with each of said worm wheels, and a shaft connecting the pair of worms to rotate them in unison in either direction of rotation, and a means to rotate the shaft in either direction.

4. In an air-craft, a fuselage structure, a swept wing structure having one swept wing section fixed to the fuselage structure at one side of the rear end thereof and having another swept wing section fixed to the fuselage structure at the opposite side of the rear end thereof, the swept wing sections having an angle of incidence for sustentation of the air-craft; a main wing structure having one main wing section mounted by a pivot at one side of the fuselage structure and having another main wing section mounted by a pivot at the other side of the fuselage structure, the said pivots mounting the main wing sections in locations that when extended laterally from the fuselage structure they have an angle of incidence and are located remotely from the swept wing sections for independent sustentation and that when swung on the pivots to rearward locations adjacent the fuselage structure they have an angle of incidence for sustentation and are in vertically tiered relation with the swept wing sections and their upper surfaces are immediately adjacent the under surfaces of the swept wing sections without intervening air flow space; and means to turn the said main wing sections to either of said positions.

5. In an air-craft, a fuselage structure, a swept wing structure having one swept wing section fixed to the fuselage structure at one side of the rear end thereof and having another swept wing section fixed to the fuselage structure at the opposite side of the rear end thereof, the swept wing sections having an angle of incidence for sustentation of the air-craft; a main wing structure having one main wing section mounted by a pivot at one side of the fuselage structure and having another main wing section mounted by a pivot at the other side of the fuselage structure, the said pivots mounting the main wing sections in locations that when extended laterally from the fuselage structure they have an angle of incidence and are located remotely from the swept wing sections for independent sustentation and that when swung on the pivots to rearward locations adjacent the fuselage structure they have an angle of incidence for sustentation and are in vertically tiered relation with the swept wing sections and their upper surfaces are immediately adjacent the under surfaces of the swept wing sections without intervening air flow space and the consolidated main wing sections and swept wing sections form one sustentation wing structure of swept wing form and having a surface area in the aggregate substantially less than the aggregate surface area of the main wing sections and swept wing sections when in the unconsolidated relative locations; and means to turn the said main wing sections to either of said locations.

6. In an air-craft, a fuselage frame structure, mounting guides fixed horizontally and longitudinally in the fuselage frame structure, a wing supporting frame mounted in the mounting guides to be movable therein forwardly or rearwardly, a wing pivot on one side of the wing supporting frame and a wing pivot on the other side of the wing supporting frame, a pair of wing sections one mounted on and pivotable on one pivot and the other mounted on and pivotable on their other pivot, a pair of geared means, one fixed on each wing section with axis coincidental with the axis of the associated pivot, a rotatable shaft mounted in bearings carried on the wing supporting frame, a pair of worms one at each end of the rotatable shaft and in engagement with one of the geared means, a toothed rack means fixed longitudinally in the fuselage structure, a spur gear fixed on the rotatable shaft and in engagement with the toothed rack means to roll on the toothed rack means in either direction and coordinate the rotation of the rotatable shaft with the movement of the wing supporting frame in either direction in the mounting guides; and an actuating motor means and interactuating transmission means between the motor means and the said wing supporting frame to impart linear movement to said wing supporting frame and said rotatable shaft to actuate them in either of their alternative coordinated movements.

7. All of the emans as described and as claimed in claim 6, and the said actuating motor means including a reversible electric motor having a driving element in operating interconnection with the interactuating transmission means and means to control the electric motor to procure driving of the driving element in either direction determined by the control.

8. In an air-craft, a fuselage frame structure; a mounting means fixed horizontally in the fuselage frame structure and including a plural number of forward cylinders each closed at one end and a plural number of rearward cylinders each closed at one end and located rearwardly of the forward cylinders, all cylinders fixed in the fuselage frame structure so that their axes are parallel to one another; a wing supporting frame having affixed thereto a forwardly extending number of pistons and a rearwardly extending number of pistons each pitson located in and reciprocable in one of the cylinders; a wing pivot on one side of the wing supporting frame and a wing pivot on the other side of the wing supporting frame; a pair of wing sections one mounted on and pivotable on one pivot and the other mounted on and pivotable on the other pivot, the wing sections being pivotable to swing laterally of the fuselage frame structure in approximately a horizontal plane; means mounted on the wing supporting frame and having operative interconnection between the wing sections and the fuselage frame structure to swing the free ends of the wing sections laterally with relation to the fuselage frame structure in coordination with movement of the wing supporting frame longitudinally of the fuselage frame structure; a pump means and conduit means between the pump means and the closed ends of the forward cylinders and a conduit means between the pump means and the closed ends of the rearward cylinders, and means to operate the pump means to selectively deliver fluid to the closed ends of the forward cylinders or to the closed ends of the rearward cylinders, and means to permit flow of fluid from the rearward cylinders when fluid flows to the forward cylinders and in the alternative condition to permit flow of fluid from the forward cylinders when fluid flows to the rearward cylinders.

9. In an air-craft, a fuselage frame structure; a mounting means fixed horizontally in the fuselage frame structure and including a plural number of forward cylinders each closed at one end and a plural number of rearward cylinders each closed at one end and located rearwardly of the forward cylinders, all cylinders fixed in the fuselage frame structure so that their axes are parallel to one another; a wing supporting frame having affixed thereto a forwardly extending number of pistons and a rearwardly extending number of pistons each piston located in and reciprocable in one of the cylinders; a wing pivot on one side of the wing supporting frame and a wing pivot on the other side of the wing supporting frame; a pair of wing sections one mounted on and pivotable on one pivot and the other mounted on and pivotable on the other pivot, the wing sections being pivotable to swing laterally of the fuselage frame structure in approximately a horizontal plane; means mounted on the wing supporting frame and having operative interconnection between the wing sections and the fuselage frame structure to swing the free ends of the wing sections laterally with relation to the fuselage frame structure in coordination with movement of the wing supporting frame longitudinally of the fuselage frame structure; a pump means, conduit means between the pump means and the closed ends of the forward cylinders and conduit means between the pump means and the closed ends of the rearward cylinders, the one conduit means connecting with one side of the pump means and the other conduit means connecting with the other side of the pump means; a motor means driving the pump means in either direction selectively, driving of the pump means in one direction forcing fluid to the closed ends of the forward cylinders and withdrawing fluid from the closed ends of the rearward cylinders, and conversely driving of the pump means in the reverse direction forcing fluid to the closed ends of the rearward cylinders and withdrawing fluid from the closed ends of the forward cylinders.

10. In an air-craft, a fuselage frame structure, a wing supporting frame mounted transversely of the fuselage frame structure and movable longitudinally of the fuselage frame structure, a wing pivot at each end of said wing supporting frame and a pair of wing sections one mounted on one of said pivots and the other on the other of said pivots by their ends adjacent said wing supporting frame, means mounted on said wing supporting frame and carried therewith to co-incidentally turn said wing sections on their pivots into positions such that they are extended substantially transversely and laterally of said fuselage structure for low speed flight or to co-incidentally turn said wing sections on their pivots into positions such that the free ends of the wing sections are swung laterally rearwardly to form swept wing sections laterally of the fuselage structure for high speed flight, the said means to turn the wing sections including a reversible electric motor having a driving element, a torque transmitting means operatively interconnecting the driving element and the wing supporting frame and the said pivots of the wing sections and the fuselage frame structure to impart turning torque on the wing sections by their pivots to turn them thereby to the laterally extended positions and move the wing supporting frame in one direction longitudinally of the fuselage structure and alternatively to turn the wing sections by their pivots to the swept wing positions and move the wing supporting frame in the opposite direction longitudinally of the fuselage structure; and means to control the electric motor to procure driving of the driving element in either direction determined by the control.

11. In an air-craft, a fuselage frame structure, a guide structure fixed to the fuselage structure, a wing supporting frame mounted in the guide structure transversely of the fuselage frame structure and movable longitudinally of the fuselage frame structure, a wing pivot at each end of said wing supporting frame and a pair of wing sections one mounted on one of said pivots and the other on the other of said pivots by their ends adjacent said wing supporting frame, means mounted on said wing supporting frame and carried therewith to co-incidentally turn said wing sections on their pivots into positions such that they are extended substantially transversely and laterally of said fuselage structure for low speed flight or to co-incidentally turn said wing sections on their pivots into positions such that the free ends of said wing sections are swung laterally rearwardly to form swept wing sections laterally of the fuselage structure for high speed flight, the said means to turn said wing sections including a transmission gearing between the guide structure and the wing ends on said pivots having one element of the transmission gearing in rolling engagement with the guide structure and another element in engagement with the said wing ends to coordinate the turning movement of the wing sections on their pivots and the movement of the wing supporting frame on the guide structure; and motor means in operative inter-connection with the wing supporting frame to impart moving force upon the wing supporting frame and through the wing supporting frame and the transmission gearing to move the wing supporting frame and co-incidentally turn the wing sections to either of the alternative conditions.

12. In an air-craft, a fuselage frame structure, a wing supporting frame mounted in the fuselage structure to be movable longitudinally forwardly or rearwardly in the horizontal plane of the fuselage structure, a wing pivot at each end of said wing supporting frame and a pair of wing sections one mounted on one of said pivots and the other on the other of said pivots by their ends adjacent said fuselage frame structure, means mounted on said wing supporting frame and carried therewith and operatively interconnected between the fuselage frame structure and the wing supporting frame to co-incidentally with movement of said wing supporting frame in one direction longitudinally of the fuselage structure turn said wing sections substantially in the plane of flight on their pivots in one direction and to co-incidentally, with movement of the wing supporting frame in the fuselage structure in the other direction longitudinally, turn said wing sections on their pivots in the other or opposite direction, the one co-incidental movement placing said wing sections in horizontally extended positions transversely of the fuselage structure for low speed flight and the other of said co-incidental movements placing the said wing sections in rearwardly retracted positions so that said wing sections then form swept wing sections for high speed flight; the last named means including a rack bar fixed longitudinally in the fuselage frame structure, a shaft mounted in and rotatable in bearings fixed on the wing supporting frame, a gear fixed on the rotatable shaft and in engagement with the rack bar to rotate the rotatable shaft in proportion to movement of the wing supporting frame forwardly or rearwardly, a pair of gear means one fixed on one wing section at its pivot and the other fixed on the other wing section at its pivot, a pair of worms fixed on the rotatable shaft one in engagement with one of the gear means and the other in engagement with the other of the gear means; and in combination an actuating motor means and interactuating transmission means in driving engagement between the motor means and the said wing supporting frame to effect either of the alternative movements.

13. In an air-craft, a fuselage, a wing supporting means mounted in the fuselage, a pair of wing sections having their inner ends pivotally connected with the wing supporting means to be oscillative in a plane approximating the horizontal, means to swing the wing sections upon their pivots; a supplemental wing means including a pair of sections each on one side laterally of the fuselage and fixed thereto, each of said sections having leading edges forming acute angles with the fuselage to form swept wings; the said first named wing sections and the supplemental wing sections having an interassociated coordination by the relative location of the axes of the said pivoted ends of the first named wing sections in their mounting and by their location relative to the fuselage, so that, by the movement of the first named wing sections on their pivots laterally rearwardly, the first named wing sections and the supplemental wing sections are consolidated in vertically tiered relation without intervening air flow space into one wing means of aggregate exposed sustentation area substantially less than the aggregate unconsolidated surfaces of the first named wing sections and said supplemental wing sections, and that, by the movement of the first named wing sections on their pivots laterally forwardly, the first named wing sections are extended horizontally and transversely from the fuselage to form wing means independently of the supplemental wing means and the said supplemental wing means forms sustentation means independently of the first named wing means.

References Cited in the file of this patent

UNITED STATES PATENTS

| Number | Name | Date |
|---|---|---|
| 1,718,617 | Wagner | June 25, 1929 |
| 1,859,716 | Rurtle | May 24, 1932 |
| 1,998,148 | Vieru | Apr. 16, 1935 |
| 2,074,897 | Everts | Mar. 23, 1937 |
| 2,579,840 | Levy | Dec. 25, 1951 |

FOREIGN PATENTS

| Number | Country | Date |
|---|---|---|
| 526,162 | Great Britain | Sept. 12, 1940 |